United States Patent [19]

Jenkins et al.

[11] Patent Number: 5,106,941

[45] Date of Patent: Apr. 21, 1992

[54] PROCESS FOR THE PREPARATION OF CRYSTALLINE POLY(CYCLOHEXANEDIMETHYLENE TEREPHTHALATE)

[76] Inventors: Waylon L. Jenkins, 2016 Lamont St., Kingsport, Tenn. 37664; Gerry F. Rhodes, Rt. 15, Box 369, Gray, Tenn. 37615; Mark Rule, 5133 Foxfire Trail, Kingsport, Tenn. 37664

[21] Appl. No.: 719,444

[22] Filed: Jun. 24, 1991

Related U.S. Application Data

[63] Continuation-in-part of Ser. No. 624,848, Dec. 10, 1990, abandoned.

[51] Int. Cl.⁵ .................................................. C08G 63/78
[52] U.S. Cl. ............................................ 528/272; 528/282; 528/283; 528/307; 528/308.6; 528/485; 528/503; 524/441; 524/442; 524/450
[58] Field of Search ............ 528/272, 282, 283, 308.6, 528/307, 485, 503; 524/441, 442, 450

[56] References Cited

U.S. PATENT DOCUMENTS

| | | | |
|---|---|---|---|
| 3,876,608 | 4/1975 | Anderson et al. | 523/214 |
| 4,282,137 | 8/1981 | Kohler et al. | 524/450 |
| 4,391,971 | 7/1983 | Massey et al. | 528/481 |

*Primary Examiner*—John Kight, III
*Assistant Examiner*—Sam A. Acquah
*Attorney, Agent, or Firm*—Charles R. Martin; William P. Heath, Jr.

[57] ABSTRACT

A process for preparing a crystalline poly(cyclohexanedimethylene terephthalate) comprising (A) preparing an admixture of molten poly(cyclohexanedimethylene terephthalate) and a 4A zeolite, and (b) cooling the admixture at a rate less than about 1000° C. per minute to a temperature less than about 80° C.

4 Claims, No Drawings

PROCESS FOR THE PREPARATION OF CRYSTALLINE POLY(CYCLOHEXANEDIMETHYLENE TEREPHTHALATE)

This application is a continuation-in-part of U.S. Ser. No. 07/624,848 filed Dec. 10, 1990, now abandoned.

This invention pertains to a process for preparing a crystalline poly(cyclohexanedimethylene terephthalate).

Poly(cyclohexanedimethylene terephthalate), or PCT, is a well known polymer with a number of useful properties, including high glass transition temperature and high melting temperature. However, usage of PCT is relatively small, particularly in the area of molding plastics where crystalline, dimensionally stable parts are required. Although PCT has substantially higher properties than competing polymers such as poly(butylene terephthalate) it is disadvantaged because of its slower crystallization rate. This deficiency has been addressed in the past by the use of hot molds and relatively long cycle times, which substantially adds to the cost of the finished parts. It would therefore be an advance in the state of the art if crystallization aids could be discovered which would allow PCT to be molded into crystalline parts with short cycle times and cold molds. In addition, because of the continuous production equipment normally used to make PCT, incorporation of crystallization aids in the polymerization step is an expensive way to incorporate polymer additives. Therefore it would be an advance in the state of the art to discover an efficient crystallization aid for poly(cyclohexanedimethylene terephthalate) which could be incorporated in a subsequent compounding step.

It is therefore an object of the present invention to product a crystalline poly(cyclohexanedimethylene terephthalate) whereby a crystallization aid is incorporated into molten PCT and resulting admixture is cooled at less than a specified rate.

It is a further object to prepare a crystalline poly(cyclohexanedimethylene terephthalate) in which the crystallization aid can be incorporated in the PCT in a post-reactor compounding operation.

It is yet a further object of the invention to produce a crystallization aid which allows crystalline PCT objects to be produced in a cold mold.

In summary, this invention can be described as a process for preparing a crystalline poly(cyclohexanedimethylene terephthalate) comprising (A) preparing an admixture of molten poly(cyclohexanedimethylene terephthalate) and a 4A zeolite, and (B) cooling the admixture at a rate less than about 1000° C. per minute to a temperature less than about 80° C.

With regard to this invention the term poly(cyclohexanedimethylene terephthalate), or PCT, means a polyester in which greater than 85% of the diacid component is derived from terephthalic acid, and greater than 85% of the diol component is derived from 1,4-cyclohexanedimethanol. Other diacid components which may be present include isophthalic acid, adipic acid, 2,6-naphthalene dicarboxylic acid, 1,4-cyclohexanedicarboxylic acid, and the like. Other diol components which may be present include diethylene glycol, neopentyl glycol, butanediol, ethylene glycol, 1,3-cyclohexanedimethanol, and the like. The PCT can be prepared by procedures well known in the art. For example, the starting diacid may be in the form of the diacid or the diester and the diol may be a free diol or may be a diol ester.

In the present invention we have discovered that incorporation of certain zeolites into PCT results in a polymer which has greatly increased rates of crystallization. Moreover, we have discovered that these increased rates of crystallization are unaffected by increased polymer molecular weight, which means high molecular weight PCT can be produced with relatively little decrease in the rate of crystallization. Furthermore, these zeolites are effective whether incorporated in the polymer synthesis or by melt blending with the final polymer, and thus afford a great degree of flexibility in producing the crystalline polymer. With certain of these zeolites, the rate of crystallization is rapid enough to allow production of crystallized parts on injection molding in cold molds where the molten polymer is subject to rapid cooling.

In general, zeolites are highly polar, crystalline aluminosilicate materials. Because of their polar, crystalline nature, they possess a regular surface with a high surface energy. Although not bound by any particular theory, we believe that certain zeolites are effective as crystallization aids for PCT because of their ability to strongly attract polymer chain units and hold them in a conformation compatible with the chain conformation of the crystalline polymer, and thus provide a site for polymer crystallization. Because the specific conformations required for crystallization and the zeolite structures which will provide the correct conformations are not known, selection of an optimum zeolite for crystallization of PCT is not obvious. Moreover, zeolites which are effective crystallization aids for PCT may be ineffective crystallization aids for other polymers.

Although polymer crystallization rates can be measured by any number of techniques, a convenient method is to measure the temperature of crystallization of heating (Tch) of amorphous PCT and the temperature of crystallization on cooling (Tcc) by differential scanning calorimetry (DSC). The greater the difference between Tcc and Tch of different polymer samples under constant DSC conditions, the greater the rate of crystallization and the larger the crystallization window. The maximum rate of cooling which will produce crystalline PCT can be calculated by the formula Maximum rate of cooling = (Tcc-Tch)/(0.3 minutes)

In addition, measurement of the heat released on crystallization and comparison with the heat adsorbed on melting provides a measure of the amount of crystallization that was already present in the sample.

In this invention the inherent viscosity of the PCT is at least 0.5 or, more preferably, is at least 0.6. Inherent viscosity is measured at 25° C. in a 60/40 by weight mixture of phenol/tetrachloroethane at a concentration of 0.5 g/100 mL.

A zeolite which has been found effective for crystallization of PCT is zeolite 4A. In contrast, zeolites such as 13X, which possess similar bulk elemental composition and polarity but differ in surface structure are essentially ineffective in enhancing the rate of crystallization of PCT. These zeolite names are common names which are generally recognized by those skilled in the art as representing specific materials with well defined chemical and structural compositions. The rate of crystallization obtained is dependent on the amount of zeolite added up to a limiting amount.

In accordance with this invention the amount of zeolite in the admixture is greater than 0.1 weight percent. In a preferred embodiment the amount of zeolite is in the range of 0.1 to 10 weight percent and correspondingly the amount of PCT is in the range of 99.9 to 90 weight percent, based on the weight of the admixture. In general, increasing rates of crystallization are observed to levels of about 5 weight percent zeolite, with only small increases in the rates above a level of 5%. Since the rate of crystallization does not appear to be strongly dependent on molecular weight with these zeolite nucleators, one can rapidly crystallize even high molecular weight PCT.

These zeolites can be readily incorporated into PCT by any suitable melt blending process, such as batch mixing, single screw, or twin screw extrusion. In addition the zeolite can be incorporated into PCT by addition at or before the polymerization reaction, if so desired. Although these zeolites may be added in any form, it is preferable to add them as fine powders with a particle size of in the range of 0.1 to 50 microns, preferably 0.1 to 5 microns. Because zeolites can absorb and release large amounts of water and hence contribute to polymer hydrolysis on melt blending, it is preferable to dehydrate the zeolites by heating to >350° C. before adding them to the PCT melt.

In accordance with this invention the admixture of PCT and 4A zeolite is cooled at a rate less than about 1000° C., preferably 500° C., per minute to a temperature less than 80° C. Although the admixture can be cooled in accordance with technology well known in the art such as contact with cool air, cool liquids and cool solids in a preferred embodiment the admixture is cooled by contact with a cool solid surface.

The process of this invention is thought to be an advancement over the prior art.

U.S. Pat. No. 3,876,608 discloses the addition of 13X or 4A zeolite in polyester as a inert filler to increase surface roughness of polyester films. In this disclosure, the molten polymer film is contacted with a cooling quench drum to obtain amorphous polymer prior to biaxial orientation. Contact with such a quench drum results in extremely high rates of cooling which are greater than 500° C. per minute.

U.S. Pat. No. 4,282,137 discloses the use of zeolites to deliver inert gas into a polyester matrix to improve dyability of polyester fibers. In this disclosure, the spun molten polyester is contacted with cool air, which results in extremely high rates of cooling and results in an amorphous polymer.

U.S. Pat. No. 4,391,971 discloses passing molten polyester through a bed of zeolite pellets in order to remove acetaldehyde. In this disclosure, the zeolite is not admixed with the polyester.

In the following examples the practice of the present invention is further described. It is understood that these examples do not limit the scope of this invention.

EXAMPLE 1

In a Haake-Buchler mixing center poly(cyclohexanedimethylene terephthalate) with an IV of 0.76 dl/g was mixed with 0, 5, and 10 weight percent of dehydrated zeolite 4A powder for five minutes at 310° C. The obtained polymers had a measured corrected IV of 0.646, 0.780, and 0.792 dl/g, respectively.

EXAMPLE 2

In a Haake-Buchler mixing center poly(cyclohexanedimethylene terephthalate) with an IV of 0.76 dl/g was melt blended with 0, 5, and 10 weight percent of dehydrated 13X zeolite powder for five minutes at 310° C. The obtained polymers had a measured corrected IV of 0.665, 0.675, and 0.669 dl/g.

EXAMPLE 3

In the following example the effect of zeolite on the crystallization behavior of PCT was examined by DSC. In this experiment, the polymer sample is heated in a DuPont Instruments 912 Differential Scanning Calorimetry instrument at a heating rate of 20° C./minute to about 325° C. The sample is then removed and cooled at a rate of 250°-500°/minute by placing the sample pan containing the polymer between two large blocks of cold aluminum. The sample is then replaced in the DSC instrument, and heated at a rate of 20° C./minute to 325° C., held for two minutes, then is cooled at a rate of 20° C./minute. The first heating gives a melting temperature Tm and heat of melting dHm. After quenching, the second heating gives a temperature of crystallization on heating and a crystallization exotherm (Tch and dHch), and a melting temperature and heat of melting. The controlled cooling of the sample then gives a temperature of crystallization on cooling and crystallization endotherm (Tcc and dHcc). The value Tcc-Tch is a measure of how broad the crystallization window is; the higher the value, the more rapid the sample crystallizes. The value dHm-dHch/dHm is a measure of how much crystallization occurred in the sample during the rapid (>250° C.) quench. If the sample crystallizes completely during the quench step, then the Tch will disappear. In the following table the values for Tm, Tcc, Tch, and dHm-dHch/dHm are given for the polymers prepared in examples 1 and 2.

TABLE I

| Polymer | TM | Tch | Tcc | Tcc-Tch | dHm-dHch/dHm |
|---|---|---|---|---|---|
| PCT | 288 | 112 | 240 | 128 | 0.37 |
| PCT-5% 13X | 289 | 115 | 238 | 119 | 0.38 |
| PCT-10% 13X | 289 | 109 | 234 | 125 | 0.42 |
| PCT-5% 4A | 290 | 109 | 261 | 152 | 0.97 |
| PCT-10% 4A | 288 | — | 257 | — | 1.00 |

EXAMPLE 4

In the following example, PCT containing 10 weight percent 4A zeolite was solid-state polymerized at 230° C., with samples removed at 2–4 hour intervals. These samples were submitted for IV and DSC analysis. The results are tabulated below:

| IV | Tm | Tch | Tcc | dHm-dHch/dHm |
|---|---|---|---|---|
| 0.780 | 292 | — | 258 | 1.00 |
| 0.838 | 289 | — | 256 | 1.00 |
| 0.904 | 291 | — | 254 | 1.00 |
| 0.958 | 291 | — | 256 | 1.00 |

We claim:
1. A process for preparing a crystalline poly(cyclohexanedimethylene terephthalate) having an inherent viscosity of at least 0.5 comprising
   (A) preparing an admixture of a molten polymer wherein greater than 85 mol percent of the diacid component is derived from terephthalic acid and greater than 85 mol percent of the diol component is derived form 1,4-cyclohexanedimethanol and a 4A zeolite, and (B) cooling the admixture at a rate less than about 1000° C. per minute to a temperature less than about 80° C.

2. The process of claim 1 wherein the amount of zeolite is greater than 0.1 weight percent.

3. The process of claim 1 wherein the zeolite has a particle size in the range of 0.1 to 50 microns.

4. A process for preparing a crystalline poly(cyclohexanedimethylene terephthalate) having an inherent viscosity of at least 0.5 comprising (A) preparing an admixture of 90 to 99.9 weight percent molten poly(cyclohexanedimethylene terephthalate) and 10 to 0.1 weight percent of a 4A zeolite powder having a particle size in the range of 0.1 to 5 microns, and (B) cooling the admixture at a rate of less than 500° C. per minute to a temperature less than 80° C.

* * * * *